United States Patent [19]

Martin et al.

[11] 4,165,821
[45] Aug. 28, 1979

[54] BEVERAGE DISPENSING MACHINE FOR MIXING GRANULAR CONCENTRATE AND WATER

[75] Inventors: Ernest N. Martin; Michael D. Munson, both of 2551 Fernwood Ave., Lynwood, Calif. 90262

[73] Assignee: Societe d'Assistance Technique pour Produits Nestle S.A., Lausanne, Switzerland

[21] Appl. No.: 914,432

[22] Filed: Jun. 12, 1978

[51] Int. Cl.² .............................................. B67D 5/62
[52] U.S. Cl. ................................. 222/129.4; 222/185; 222/460
[58] Field of Search .......... 222/146 HE, 129.3, 129.4, 222/460, 461, 564, 185

[56] References Cited

U.S. PATENT DOCUMENTS

| 3,084,613 | 4/1963 | Maxson | 222/146 HE |
| 3,266,670 | 8/1966 | Brooks et al. | 222/146 HE X |
| 3,332,584 | 7/1967 | Pennington | 222/292 |
| 3,884,389 | 5/1975 | Martin | 222/146 HE |
| 4,116,246 | 9/1978 | Franzen | 222/146 HE X |

Primary Examiner—David A. Scherbel
Attorney, Agent, or Firm—Georges A. Maxwell

[57] ABSTRACT

A counter top beverage dispensing machine operable to selectively and intermittently combine and mix measured volumes of granular dehydrated beverage concentrate and water and to dispense the resulting beverage in a waiting receptacle; the machine is characterized by a receptacle supporting base with a removable drip tray, a column projecting up from the base in which water and concentrate components of the machine are housed and which has a removable panel to afford access to said components and a hopper section removably engaged with and supported atop the column; the hopper section includes a concentrate receiving hopper with driven concentrate dispensing means at its lower end which dispensing means is normally releasably engaged with drive means carried by the column and is related with mixing means carried by the column into which concentrate and water is introduced and from which beverage is dispensed into the waiting receptacle.

10 Claims, 5 Drawing Figures

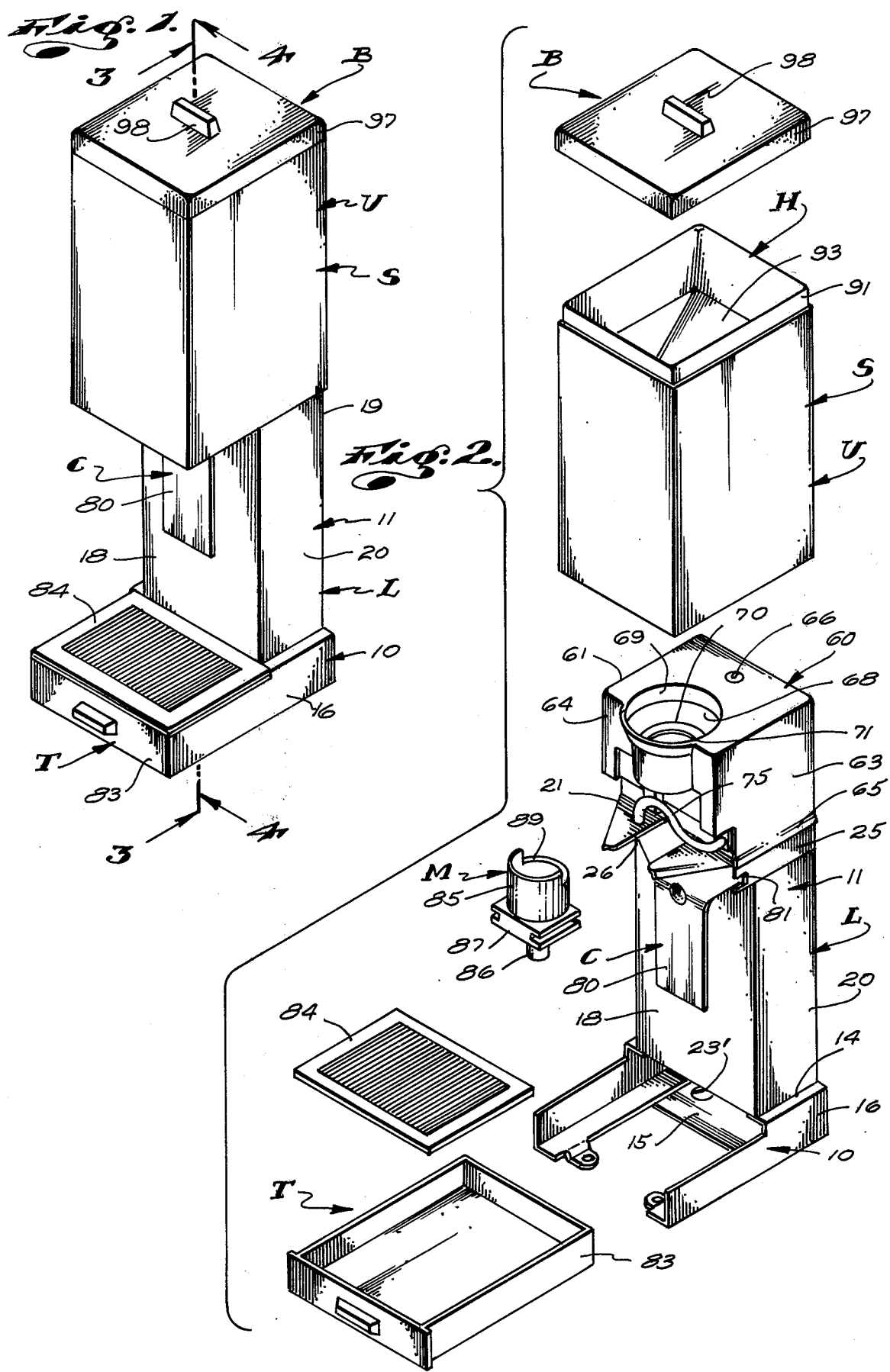

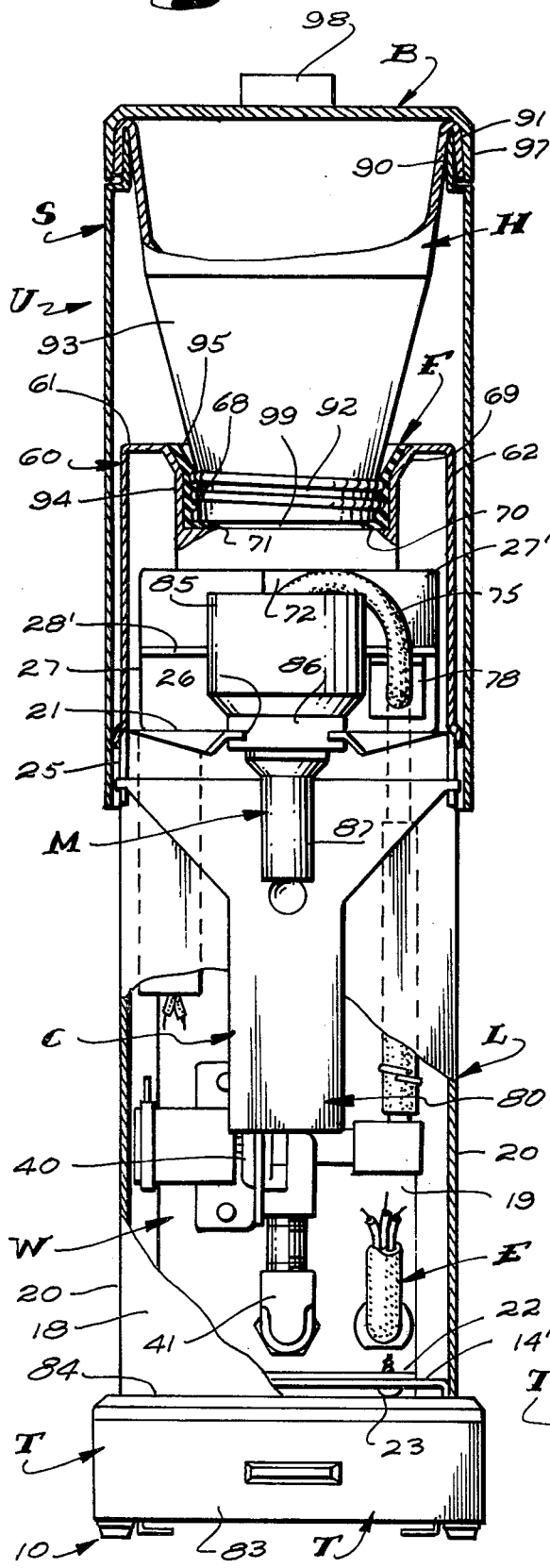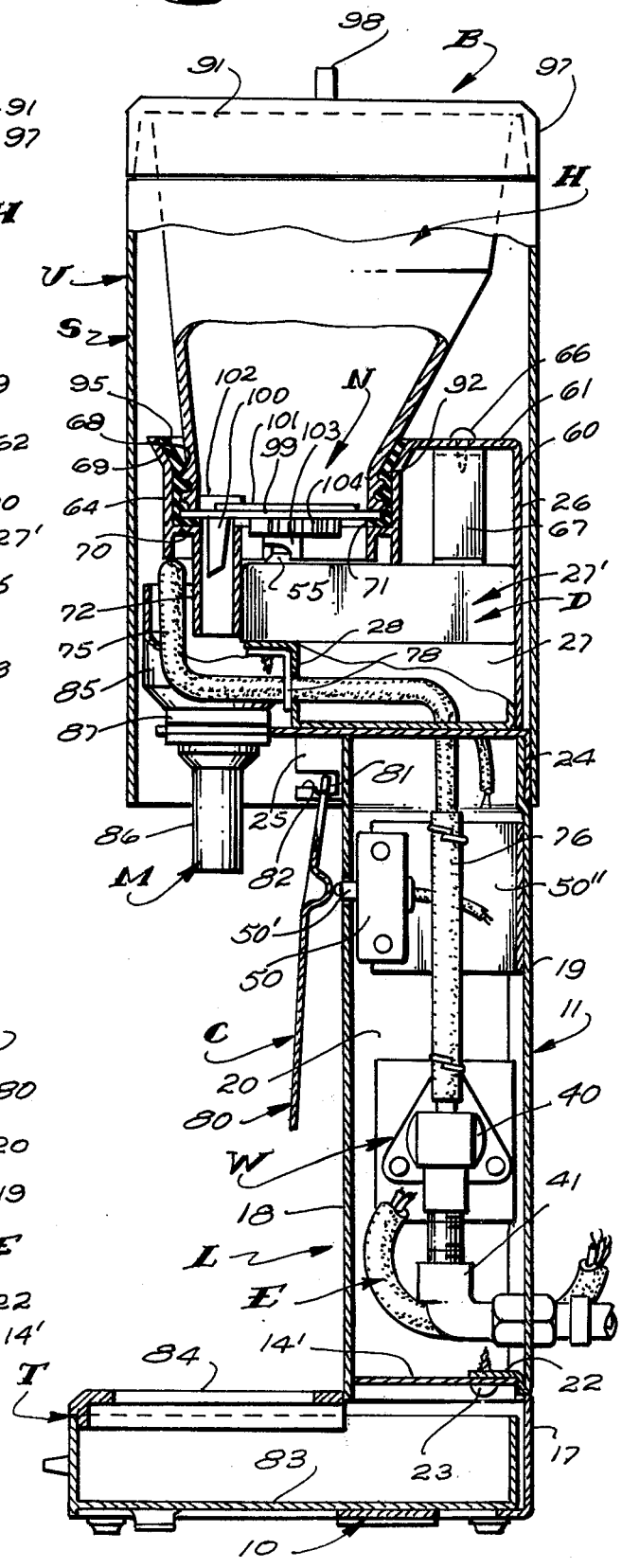

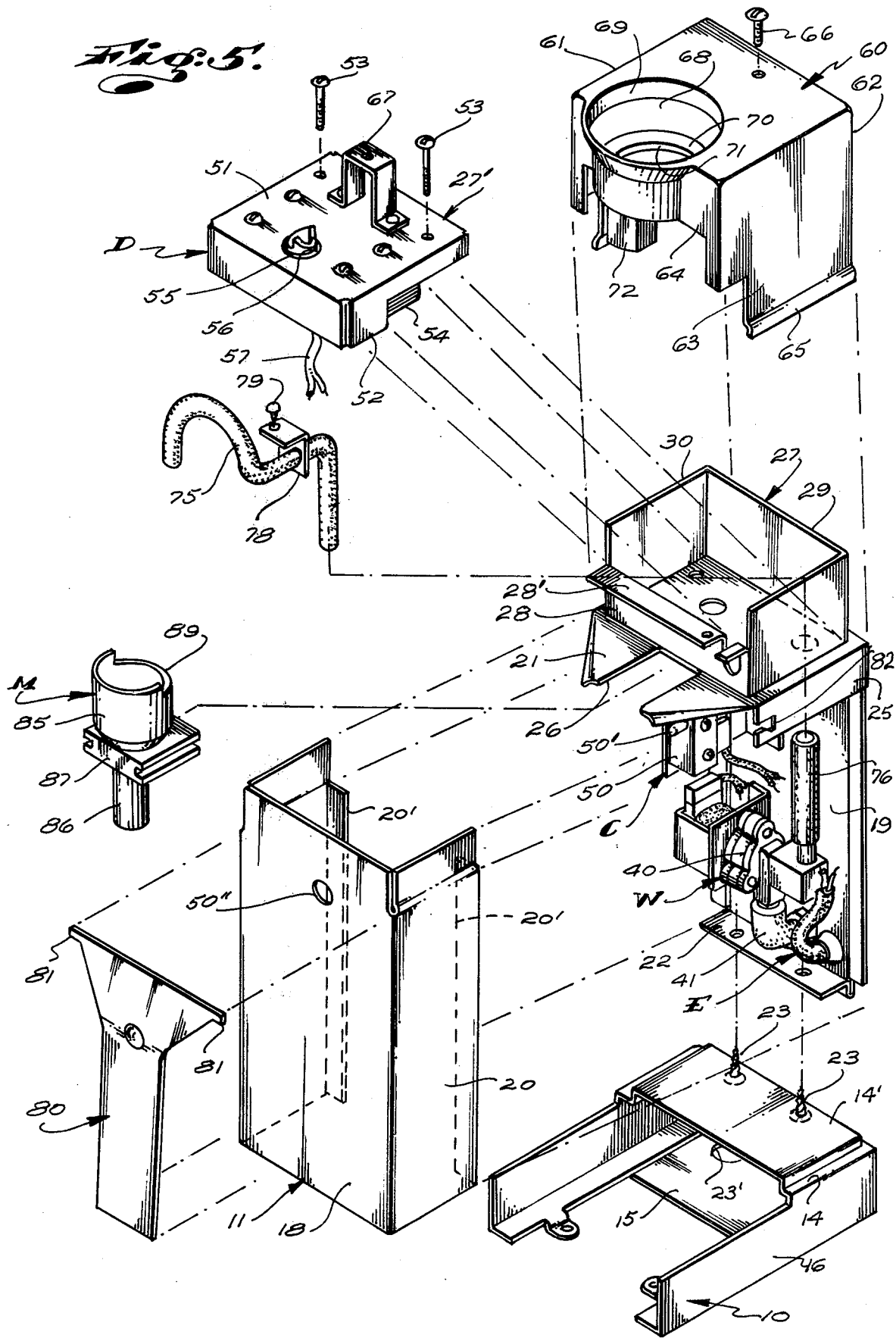

BEVERAGE DISPENSING MACHINE FOR MIXING GRANULAR CONCENTRATE AND WATER

This invention has to do with a beverage dispensing machine and is particularly concerned with an improved beverage dispensing machine structure which is easy and economical to manufacture, maintain and service.

The present invention relates to that type and/or class of beverage dispensing machine which operates to mix measured amounts of granular or particulate beverage concentrate, such as instant tea, with measured volumes of water and to dispense reconstituted beverage into waiting drinking containers, such as beverage glasses.

Machines of the general class referred to above characteristically include elevated hoppers in which supplies of dehydrated tea concentrate or the like are contained, motor driven concentrate dispensing means related to lower discharge openings in the hoppers to intermittently discharge measured volumes of concentrate into drinking glasses positioned below the dispensing means, water delivery means to intermittently deliver measured volumes of water into the glasses and control means for the dispensing and delivery means to effect intermittent operation thereof. In practice, it is common to provide mixing funnels or the like below the dispensing means and outlets of the water delivery means to occur above the glasses and in which concentrate and water are deposited and combined prior to being conducted into the glasses.

The control means in such machines commonly include drinking glass engaging levers normally occurring in the space to be occupied by and adapted to be displaced by the glasses when they are arranged with the machines to receive beverage therefrom and control switches operatively related to the lever arms and connected with the concentrate dispensing and water delivery means, whereby the machines only operate to dispense reconstituted beverage when and during that period of time when a beverage glass is related to the machine to receive such beverage.

Finally, machines of the general character here concerned with commonly include drip trays to occur beneath and to support beverage glasses arranged with the machines to receive beverage thereby.

Beverage dispensing machines of the general character referred to above which have been provided by the prior art have characteristically included sheet metal cabinets or housings with internal frame work and removable access panels about the exteriors thereof. The various components and parts which go to make up the machines are suitably mounted on the frame work within the housings in a substantially permament manner and, oftentimes, where they are not only obscured from view, but are relatively inaccessible for cleaning and/or servicing. Such prior art machines are commonly assembled as unitary assemblies and are such that when normal servicing and/or repair is required, the machines must be dismantled to a substantial extent by especially trained and skilled service or repair men.

Beverage dispensing machines of the character here concerned with are commonly mounted on counter tops in restaurants and the like so that their lower portions are suitably elevated for convenient access and use of the machines. Such machines are of substantial, vertical extend and are such that when they are supported on counter tops and the like, their upper ends are elevated to an extent that they are inaccessible for visual examination and servicing of the concentrate hoppers arranged therein. As a result of the above, when the hoppers of such machines (which are commonly accessible through normally closed access openings in the sides of the housings of the machines) require inspection or servicing and when replenishing of the supply of concentrate therein is required, it is commonly necessary that the persons servicing the machines dismantle the housings or remove panels related to access openings in the sides of the housings to gain access to the hoppers.

Another serious shortcoming in beverage dispensing means of the general character here concerned with and provided by the prior art resides in the tendency for the mixing means or units, into which concentrate and water are deposited and mixed preparatory to delivery of reconstituted beverages into waiting beverage glasses, to become fouled with accumulated moistened concentrate. As a result, the receiving means or units require frequent cleaning. The foregoing shortcoming is compounded in most prior art machines by the fact that the mixing means or units are fixed in the machines in such a manner that easy access thereto for the purpose of cleaning the units is not possible.

An object and feature of the present invention is to provide an improved beverage dispensing machine which includes a pair of sectional housing units in which the several parts and means going to make up the machine are arranged, which units are easily and conveniently disengageable from each other to provide easy and convenient access to the parts and means of the machine carried thereby, for the purposes of servicing and maintaining the machine.

It is another object and feature of the present invention to provide a machine of the general character referred to above wherein the housing units include a lower sheet metal unit, having a lower, flat, horizontal base with a drip tray receiving recess therein and an upwardly projecting tubular column releaseably secured to the base and in which elements and parts of a water dispensing means and control means are arranged and atop which a drive means for a concentrate dispensing means, a mixing means or unit, and other elements and parts of the water dispensing means are carried; and, an upper sheet metal unit in which a concentrate hopper and motor driven concentrate dispensing means are arranged and which is releasably engaged with and about the upper end of the lower unit whereby said upper unit can be removed from said lower unit for easy and convenient access to said hopper and said concentrate dispensing means.

A further object and feature of this invention is to provide a machine of the general character referred to including novel means to releasably support, orient and couple the structure of the upper unit with related structure of the lower unit.

The foregoing and other objects and features of this invention will be fully understood and will be apparent from the following detailed description of a typical preferred form and carrying out of the invention, throughout which description reference is made to the accompanying drawings in which:

FIG. 1 is an isometric view of the beverage machine;

FIG. 2 is a partially exploded isometric view of the machine;

FIG. 3 is an enlarged sectional view taken substantially as indicated by line 3—3 on FIG. 1;

FIG. 4 is an enlarged sectional view taken substantially as indicated by line 4—4 of FIG. 1; and FIG. 5 is an exploded isometric view of a portion of the machine.

Referring to the drawings, the beverage dispensing machine here provided includes two major, releasably engageable assemblies or units. The machine includes a lower assembly or unit L and an upper hopper assembly or unit U.

The lower unit L comprises a fabricated sheet metal housing in and with which various means and components of the machine are related.

The unit L includes a lower, horizontal support surface engaging base section 10 and a vertical, sectional column 11 releasably fixed to and projecting upwardly from the base 10.

The base 10 is an elongate, flat, horizontal box-like unit or section established of sheet metal. The base 10 has top and bottom walls 14 and 15, side walls 16 and a rear wall 17. The front of the base is open and the forward portion of the top wall 14 is removed so that the forward portion of the box-like base opens forwardly and upwardly to receive a drip tray assembly T, as will hereinafter be described.

The bottom wall 15 need not be coextensive with the bottom of the base, but can have its forward portion removed, as clearly shown in FIG. 5 of the drawings.

The top wall 14 of the base 10 is formed to establish a flat, elevated, horizontal pad 14' with substantially vertical edges about its perimeter and corresponding in plan configuration with the interior cross-section of the column 11.

In accordance with common practice, and as shown in the drawings, the base 10 can be provided with suitable brackets to facilitate securing the base to a relating supporting surface and can be provided with rubber or plastic button type feet to prevent scarring of the surface on which the machine is set.

The column 11 of the unit L is an elongate, vertical, tubular assembly, rectangular in cross-section.

The column 11 has front, rear and side walls 18, 19 and 20, with straight, horizontal, top and bottom edges and has a mounting plate 21 overlying and projecting forwardly from the upper end thereof.

The front and side walls 18 and 20 are defined by a U-shaped sheet metal part. The vertical rear edges of the side walls 20 have laterally, inwardly projecting flanges 20'. The rear wall 19 of the column is a substantially flat, vertical plate, the vertical side portions of which are forwardly offset to occur forward of the flanges 20' when the rear wall is arranged between the rear edges of the side walls, whereby the rear surfaces of the flanges 20' and wall 19 occur in a common plane. the lower end of the rear wall 19 is formed to establish a horizontal forwardly projecting mounting flange 22.

The lower open end of the column 11 is engaged about the pad 14' on the base 10 with the lower edges of its several walls seated on the top wall 14 of the base about said pad. When the column 11 is thus related to the base 10, the flange 22 on the column establishes flat engagement on the top of the pad 14' and is releasably secured thereto by a pair of screw fasteners 23 engaged through the pad and said flange through access openings 23' provided in the bottom wall 15 of the base.

The mounting plate 21 at the upper end of the column is a flat, horizontal sheet metal part with a rear portion engaged over and supported by the upper end of the front, rear and side walls 18, 19 and 20. The plate 21 has a depending rear wall or flange 24 which occurs outward of and which is fixed to the upper end portion of the rear wall 19, as by spot welding. The plate 21 next includes depending side walls or flanges 25 which occur outward of and slidably engage the upper end portions of the side walls 20. The upper end portions of the walls 19 and 20 are inwardly offset to accommodate the flanges 24 and 25 and so that the outer surfaces of the walls and flanges occur in a common plane.

The flanges 25 of the plate 21 project a limited distance forward of the front wall 18 of the column.

The forward portion of the plate projects freely forwardly from the front wall 18 of the column and is formed with an elongate forwardly and vertically opening notch 26 with straight, parallel side edges in which a mixing unit M, to be later described, is normally slidably engaged.

Finally, the plate 21 at the top of the column 11 includes or carries the upwardly opening box-like lower section 27 of a motor housing. The motor housing section 27 on the plate 21 includes front, rear and side walls 28, 29 and 30. The rear and side walls 29 and 30 have straight upper edges while the front wall 28 is less in vertical extent that the rear and side walls 29 and 30 and has a forwardly projecting horizontal support flange 28' formed thereon (see FIG. 5 of the drawings). In practice, the motor housing section 27 is fixed to the upper rear portion of the plate 21 as by spot welding, screw fasteners or the like (not shown).

The housing section 27 can have a bottom wall or the bottom wall thereof can be established by the plate 21.

The column 10 of the lower unit L houses a solenoid operated water valve 40 of a water delivery means W. The valve 40 is mounted on the inside surface of the rear wall 19 of the column and is connected with a remote water supply (not shown) by means of a suitable water conducting fitting 41 engaged through the rear wall 19, connected with the inlet side of the valve 40 and with which a water supply can be connected, in accordance with common practice.

The column 10 of the unit L also houses an operating switch 50 of a control means C. The switch 50 is carried by a bracket fixed to the rear wall 19 and has a forwardly projecting operating stem or button 50' which projects freely and forwardly through an opening 50" in the front wall 18 of the column, as clearly shown in the drawings.

In addition to the valve 40 and switch 50, the column 11 can and preferably does house an electrical terminal block (not shown) to facilitate convenient connecting of the electrical components of the machine with an electric power supply line E. The supply line E is a common power service line and is shown extending through an insulating grommet engaged through the rear wall 19 of the column.

From the foregoing, it will be apparent that the side flanges 25 of the mounting plate 21 which plate is fixed to the upper end of the wall 19, slidably engage the exterior of the upper ends of the side walls 20 to effectively retain the upper ends of the parts of the column in assembled relationship. Further, the front wall 18 of the column extending between the base 10 and the plate 21 normally affords vertical support for the forward portion of the plate 21. Still further, the forward portions of the flanges 25 of the plate and the forward slotted portion of the plate normally project freely forwardly from the upper end of the column to occur in vertical spaced relationship above the forward portion of the base 10.

It is to be noted that the rear wall 19 is releasably secured to the base 10 by the fasteners 23 which are readily accessible at the bottom of the base and that upon releasing and removing the base 10 from the bottom of the column, the U-shaped section defining the front and side walls 18 and 20 can be slid downwardly from engagement with the rear wall 19 and the plate 21 to provide free access to the various components and parts of the construction which are mounted and housed within the column. That is, free access to the components and parts of the machine within the column can be attained by simply releasing the base 10 from the column and sliding the section defining the front and side walls of the column from engagement with the rear wall and mounting plate thereof.

The lower unit L next includes an upper motor housing section 27' in the nature of a downwardly opening cap or cover for the aforementioned lower motor housing section 27. The upper motor housing section 27' has a flat horizontal top wall 51 and depending side walls 52. The upper wall overlies the lower motor housing section 27 carried by the plate 21 and is secured to the section 27 and/or plate 21 by screw fasteners 53 engaged through the top wall 51 and into the plate 21.

The upper section 27' carries an electric drive motor 54 which motor is screw fastened to the lower surface of the top wall 51 to normally occur within the assembled motor housing.

The motor 54 has a vertically upwardly projecting drive shaft (not shown) which carries an upwardly disposed drive part 55 of a spiral drive coupling. The coupling part 55 projects freely upwardly through an opening 56 in the central forward portion of the top wall 51 of the motor housing and is freely accessible at and above the top of said motor housing.

The motor 54 has a power line 57 which depends through an opening in the bottom of the housing and/or plate 21 and into the column 11 where it is suitably connected with the power supply and with the control switch 40 of the means C.

The motor housing established by the housing sections 27 and 27' and the motor 54 and coupling part 55 combine to establish what is and will hereinafter be referred to as the drive means D for the machine.

The lower unit L next includes a downwardly opening substantially box-like hopper support 60 of molded plastic. The hopper support 60 serves to orient and support the upper hopper unit U of the machine, as will hereinafter be described.

The hopper support 60 also serves as a dust cover for the drive means D.

The hopper support 60 has a flat, horizontal top wall 61, rear wall 62, side walls 63 and a front wall 64. The top wall 61 overlies the means D in vertical spaced relationship therewith. The rear wall 62 and the rear portion of the side wall 63 depend about the rear and sides of the motor housing of the means D and engage and stop against the plate 21 about portions of the rear end side edges of the plate related thereto. In practice, and as shown in the drawings, the lower plate engaging side edges of the support are formed with outwardly offset depending orienting flanges 65 which engage the upper related edge portions of the side flanges 25 of the plate 21.

The forward portions of the side wall 63 of the support 60 are relieved and the front wall 64 is less in vertical extent than the side walls and is relieved so that the upper forward portion of the support projects freely forwardly from the motor housing, above the top plane of that housing.

The support 60 is releasably secured in place by a screw fastener 66 engaged through the top wall 61 and engaged in a bracket 67 fixed to and projecting upwardly from the top wall 51 of the motor housing section 27.

The upper forward portion of the hopper support 60 is formed with a centrally located upwardly opening socket 68 which is above and concentric with the spiral drive coupling part 55 of the means D.

The socket 68 has a cylindrical lower portion, a downwardly convergent conical upper portion 69 and a horizontal bottom wall 70. The bottom wall 70 is provided with a large central opening or aperture 71. The bottom wall 70 is in spaced relationship above the top wall 51 of the motor housing.

the location and diameter of the socket 68 is such that the forward portion thereof projects forwardly from the motor housing. The forward portion of the bottom wall 70 of the socket carries an elongate vertical dispensing duct 72 which depends freely from the forward portion of the support, forward of the motor housing. The lower end of the duct 72 terminates in spaced relationship above the forward slotted portion of the mounting plate 61 of the column 11 and in vertical alignment with the slot 26.

In addition to the foregoing, the water supply means carried by the lower unit L includes a metal water delivery tube 75 to receive water from the valve 40 within the column and to discharge water at a location adjacent the lower end of the dispensing duct 72. The tube 75 has a vertical downwardly opening lower end portion extending upwardly from within the column 11 through an opening in the plate 21 and into the motor housing. The tube next includes a forwardly extending horizontal central portion extending through the front wall of the motor housing, at one side thereof, and an upwardly and thence downwardly curved forward portion extending laterally inwardly from the central portion to terminate adjacent the lower open end of the duct 72 and disposed substantially downwardly.

The lower rear end of the tube 75 is coupled with the outlet side of the valve 40 by a rubber or plastic coupling hose 76 and related hose-clamps 77 in accordance with common practice.

In the case illustrated, the tube 75 has a mounting bracket 78 fixed to its central portion to engage the flange 28 of the motor housing and which is releasably secured to the flange 28 by a screw fastener 79.

The control means C, in addition to the above noted control switch 50 within the column 11 includes a switch actuating lever 8. The lever 80 is an elongate vertical plate-like part having laterally outwardly projecting trunions 81 at its upper end pivotally engaged in notches 82 in the forward end portions of the side flanges 25 of the plate 21 which occur forward of the front wall 18 of the column. The pivotally supported lever arm has an upper portion which normally enga-es the forward end of the operating button stem 50' of the switch 50 and a downwardly and forwardly inclined lower portion, the lower end of which occurs in forward spaced relationship from the wall 18 and in vertical spaced relationship between the base 10 and mounting plate 21 to occur in substantial vertical alignment with the duct 72. The lever 80 is arranged and disposed so that when a beverage glass is manually positioned between the base 10 and plate 21 in alignment with the duct 72, the lever is pivoted and urged or displaced rearwardly by the glass to close the switch 50.

It will be apparent from the foregoing that the lower unit L is made up of easy and economical to make and assemble parts and is such that it can be easily and conveniently cleaned and serviced, when and as circumstances require.

The forementioned drip tray assembly T consists of a simple upwardly opening box-like drawer 83 slidably engaged within the base 10 from the forwardly and upwardly opening forward portion of the base and includes a slotted cover or grate 84 removably engaged and overlying the forward portion of the drawer to normally occur forward of the wall 18 of the column and overlie the forward upwardly opening portion of the base.

It will be apparent that the drip tray assembly is effective to collect liquids spilled above the forward portion of the base and is such that it can be easily and conveniently removed for purposes of emptying the drawer and cleaning the assembly.

The mixing device or unit M here provided is a unitary part which can be advantageously molded of plastic or the like and includes an upper, upwardly opening funnel 85, a lower discharge neck 86 and an intermediate mounting block 87. The upper funnel portion of the unit M has a cylindrical upper portion and a downwardly inclined conical lower portion. The neck 86 is a simple vertically extending tubular portion communicating with and depending from the lower portion of the funnel and has an open lower end. The mounting block 87 is a simple block-like portion formed centrally of the unit. The block 87 is slightly greater in lateral extent than the notch 26 in the mounting plate 21 of the column 11 and has horizontal laterally outwardly opening grooves in its opposite sides to slidably receive the inner edge portions of the plate 21 which define the notch 26. The block of the unit M is normally releasably slidably engaged in the notch 26 in the plate 21 with the upper funnel portion thereof engaged about the lower downwardly opening end portions of the dispensing duct 72 and of the water conducting tube 75. The unit M is arranged in the slot 26 and relative to the plate 21 so that the neck 87 thereof is in substantial vertical alignment with the duct 72.

To facilitate forward shifting of the unit M from engagement with the plate 21 and from engagement about the lower end portions of the duct 72 and tube 75, the rear portion of the upper funnel portion of that unit is relieved as at 79 to permit movement of the unit by said duct and tube.

With the unit M set forth above, it will be apparent that that unit is a simple and economical to make part and is such that it can be easily and quickly removed from engagement in and with the machine for the purpose of cleaning and/or servicing the unit. Convenient access to and easy removal of the mixing unit M is highly desirable since such mixing units in beverage dispensing means are highly subject to becoming fouled by the accumulation of moistened beverage concentrate and require frequent cleaning.

The upper hopper unit U of the present invention is adapted to be releasably engaged with and supported by the lower unit U and includes a hopper H, a housing sleeve S carried by the hopper, an upper cover B engageable with the hopper, a lower cap S engageable with the hopper and a motor driven dispensing means N carrier by the cap.

The sleeve S of the unit U is a simple, elongate vertical rectangular metal sleeve with open upper and lower ends. The lower end portion of the sleeve is normally freely and slidably engaged about the upper portion of the lower unit L to terminate at a point below the flanges 24 and 25 of the mounting plate 21 of the unit L whereby all parts of the unit L carried by the mounting plate 21, except for the lower end portion of the lever 80 of the means C and the neck 87 of the unit M, are normally obscured from view.

The upper portion of the sleeve terminates a substantial distance above the uppermost portion of the unit L and has an inwardly offset vertical rim 90 about its perimeter.

The hopper H is an elongate vertical container having an enlarged open upper end which is substantially the same in plan configuration with the rim 90 of the sleeve and which has an outwardly and downwardly turned rim skirt 91 about its perimeter and which establishes hooked engagement over and extends about the exterior of the rim 90 of the sleever. The skirt 91 is suitably fixed with a rim 90 as by means of a suitable cement or the like.

The hopper H has a lower downwardly opening, externally threaded cylindrical mouth or neck 92 at its lower end, which neck is concentric with, is smaller in diameter than, and normally occurs within the socket 68 in the hopper support 60 of the unit L. Finally, the hopper has upwardly and outwardly inclined side walls 93 extending through the shell and between the neck 92 and the upper open end thereof.

the cap S of the unit U is a soft, plastic or rubber part having an internally threaded cylindrical body portion 94 threadedly engaged about the neck 92 of the hopper and normally slidably engaged in the cylindrical portion of the socket 68 in the hopper support 60. The cap F of the unit U is a soft, plastic or rubber part having an internally threaded cylindrical body portion 94 threadedly engaged about the neck 92 of the hopper and normally slidably engaged in the cylindrical portion of the socket 68 in the hopper support 60. The cap F has an upwardly and outwardly inclined sealing flange 95 about the upper end of the body which flange normally establishes seated sealing engagement in the upper inclined or tapered portion 69 of the socket 68. The cap next includes a horizontal apertured bottom wall 96 normally in stopped supported engagement with the bottom wall 70 of the socket 68, with its aperture in substantial register with the aperture 71 in said bottom wall 70 (see FIG. 4 of the drawings).

With the structure disclosed above, it will be apparent that the hopper H, with the cap F engaged on and about the lower neck 92 thereof, and seated in the socket 68 of the unit L, is effectively releasably supported by and projects freely upwardly from the lower unit L and that the shell S, carried by the hopper, depends freely from the upper end thereof to normally occur about and suitably obscure the parts and means of the machine which would detract from its aesthetic appearance.

The cover B is a simple, flat horizontal cover engageable over the open top of the hopper H and has a depending retaining flange 97 about its perimeter. The flange 97 occurs about and obscures the skirt 91 of the hopper and is related to the shell S so that its outer surface is flush with the exterior surface of the sleeve.

The cover B is preferably provided with a handle 98 to facilitate its removal from engagement with the hopper.

The motor driven material dispensing means N is the same as or similar to that material dispensing means which is described in detail in U.S. Pat. No. 3,332,584 issued July 25, 1967 to Leroy E. Pennington and entitled "DISPENSING APPARATUS HAVING AN ADJUSTABLE ARTICLE DISCHARGE MEANS".

The means N consists of a horizontal mounting plate or disc 99 which is arranged between the bottom edge or rim of the neck 92 of the hopper H and the bottom wall 96 of the cap F, to overlie and substantially close the lower open end of the neck. The disc 99 of the means N has a material conducting chute 100 depending from its lower surface. The chute 100 is spaced radially outwardly from the central axis of the disc and arranged to occur forward of said axis of the disc, in alignment with and normally engaged or projecting into the upper end portion of the duct 72 of the hopper support 60 of the unit L.

The means N next includes a motor driven plate 101 arranged atop the disc. The plate 101 is provided with a plurality of circumferentially spaced material transporting apertures (not shown) which move across the open end of the chute 100 when the plate is rotated. The disc carries a screed element 102 which overlies the apertured plate where it overlies the upper open end of the chute. As the plate rotates in the hopper above the disc, material, such as instant tea, is collected in the apertures of the plate and is transported below the screed 102 and above the upper open end of the chute to drop down into and through the chute. In the instant case, the material deposited in and going through the chute is conducted by the duct into the mixing means or device in M.

The means N next includes a spiral coupling driven part 103 which is carried by the plate to depend from the disc and which is normally in driving engagement with the spiral coupling drive part 55 of the means D.

Finally, the means N includes means for adjusting the amount of material it will measure and dispense when the plate is rotated or driven. The means for adjusting the means N includes a part 104 which is readily and freely accessible at the bottom of the disc. The adjusting means operates to vary or alter the radial alignment of the apertures in the plate with the upper open end of the chute and to thereby vary the amount of material which is moved through the means N.

Should further description and explanation of the structure and operation of the means N be desired, reference is made to the above referred to U.S. Pat. No. 3,332,584.

It is important to note that the spiral coupling means is such that it allows for free and easy making and breaking of drive between the means D and N upon vertical movement of the unit U relative to the unit L and in no way interfers with or impedes moving of said units U and L into and out of engagement with each other.

It is further important to note that the socket 68 in the hopper support of the lower unit L and the neck 92 of the hopper H, with the cap F and means N related to it, are offset from the central axis of the shell S and from the central axis of the portion of the unit L about which the unit U is normally engaged so that the units L and U can only be cooperatively engaged with each other when the upper unit U is properly rotatably oriented above and with the lower unit U.

In use and in operation, the hopper H is filled with a supply of dry, particulate or granular beverage concentrate, such as instant tea. The units L and U are assembled as illustrated in FIGS. 1, 3 and 4 of the drawings and the machine is connected with a suitable electric power supply and pressurized service water supply. The means N is suitably set or adjusted so that a predetermined volume of concentrate is discharged from the hopper and delivered to the mixing means M when the switch of the control means C is closed and when the means N is driven by the means D. The solenoid valve 40 of the water supply means W is set or adjusted so that a predetermined volume of water is delivered to the means or unit M when the switch of the control means is closed, which volume of water is in the desired predetermined ration with the volume of concentrate delivered by the unit M, as the machine operates. The switch of the means C is closed upon engagement and displacement of the lever 80 with a beverage glass manually arranged beneath the neck of the mixing means M. Concentrate and water delivered into the mixing unit M mixed together in the upper funnel portion thereof and drain therefrom through the neck thereof into the glass. When the glass is filled, it is removed from engagement in and with the machine, permitting the switch of the control means C to open, thereby stopping operation of the machine until another glass to be filled with beverage is engaged therewith in a similar manner.

When it is necessary to replenish the supply of concentrate in the hopper, the upper unit U is manually lifted from engagement with the lower unit L and is set on a counter or the like where access to the upper end thereof is conveniently accessible. With the upper section thus removed and supported, the cover is removed therefrom and a new supply of concentrate can be poured or introduced into the hopper from the upper open end thereof.

It is important to note that the upper unit U, with the hopper H, is easily removable from engagement with the lower unit L for the purpose of refilling and for servicing the hopper, whenever such is required. This is important since the hopper can be easily and conveniently moved and set in a location where easy access to the interior thereof is made possible.

The above is distinct from conventional machines where the hopper or container which holds a supply of concentrate cannot be readily removed for purposes of replenishing the supply of concentrate and where one must elevate himself on a chair, ladder or onto the counter on which the machine is supported to gain access to the hopper to and through the upper end of the machine.

It is also important to note that when the upper hopper unit U is removed from engagement with the lower unit L, easy access can be had to the means N at the bottom of the hopper H for the purpose of adjusting that means.

Still further, it is important to note that when the upper hopper unit U is removed from engagement with the lower unit L, the mixing unit M is fully exposed and accessible whereby that unit can be easily and quickly withdrawn from engagement with the mounting plate 21, cleaned or otherwise services, and re-engaged with the plate 21, without the use of any special tools or skills and as clearly illustrated in FIG. 2 of the drawings.

Having described only one typical preferred form and carrying out of the invention, we do not wish to be limited to the specific details herein set forth but wish to reserve to ourselves any modifications and/or variations that may appear to those skilled in the art and which fall within the scope of the following claims:

Having described my invention, I claim:

1. A beverage dispensing machine comprising a lower unit having an elongate horizontal base with front, rear, side, top and bottom walls, an elongate vertical tubular column with upper and lower ends projecting upwardly from the rear portion of the base, a mounting plate at the upper end of the column and having a forward portion projecting forwardly therefrom in vertical spaced relationship above the forward portion of the base, an electric motor mounted on top of the mounting plate and having an upwardly projecting drive shaft with a drive coupling part, a hopper support mounted on said mounting plate and having an upwardly opening socket with an apertured bottom above the drive coupling part; said support has a discharge duct depending from the socket, a mixing unit carried by the forward portion of the mounting plate with an upper funnel portion in substantial vertical alignment with the duct and a lower tubular discharge neck portion depending from the funnel portion, a normally closed solenoid operated water valve with inlet and outlet sides mounted in the column, a water supply connected with the inlet side of the valve and with a remote water source, an elongate water delivery tube with one end connected with the outlet side of the valve and extending through the column and mounting plate and to the funnel portion of said mixing unit and control means including a normally opening control switch in the column and having an operating member projecting through and from said column; said switch is connected with an electric power supply line extending from said lower unit to a remote power supply and with said motor and valve whereby said motor is energized and said valve is open when the switch is closed, an upper hopper unit including a vertically extending material hopper with an open upper end neck at its lower end, a cap with a body portion engaged about said neck and removably engaged in said socket and a bottom wall normally seated on the bottom of said socket, a motor driven material dispensing means carried by the cap and having a depending material conducting chute communicating with the upper end of the duct and a depending driven shaft with a driven part normally releasably engaged with said drive part, said dispensing means operates to transport measured volumes of material in the hopper into said chute for delivery through the duct and into the mixing unit when the motor is energized.

2. The beverage dispensing machine set forth in claim 1 wherein said forward portion of the mounting plate has a central forwardly and vertically opening notch with laterally spaced inwardly disposed side edges, said mixing unit has a body portion with a laterally outwardly disposed grooves normally slidably receiving the edges of the plate defining said notch, whereby said mixing unit is freely shiftable into and out of supported engagement with the mounting plate.

3. The beverage dispensing machine set forth in claim 2 wherein the duct and the tube depend into the upper funnel portion of the mixing unit, the rear portion of said funnel portion is relieved to freely accommodate said end portions of the duct and tube when said unit is moved forwardly and rearwardly relative thereto.

4. The beverage dispensing machine set forth in claim 3 wherein the forward portion of the base opens forwardly and upwardly, a drip tray assembly comprising an upwardly opening box-like drawer substantially coextensive in plan configuration with the inside plan configuration of the base and shiftable into and out of engagement in the base from the open front end thereof and a grate corresponding in plane configuration with the plan configuration of the open top portion of the base and shiftable into and out of supported engagement over and with said forward portion of the base and the drawer therein.

5. The beverage dispensing machine set forth in claim 1 wherein the forward portion of the base opens forwardly and upwardly, a drip tray assembly comprising an upwardly opening box-like drawer substantially coextensive in plane configuration with the inside plan configuration of the base and shiftable into and out of engagement in the base from the open front end thereof and a grate corresponding in plan configuration with the plan configuration of the open top portion of the base and shiftable into and out of supported engagement over and with said forward portion of the base and the drawer therein.

6. The beverage dispensing machine set forth in claim 1 wherein said elongate vertical tubular column has flat front, rear and side walls with upper and lower ends, the lower end of said rear wall of the column is releasably fixed to the base; said front and side walls of the column are established of a unitary part substantially U-shaped in cross-section; said side walls of the column have laterally inwardly projecting flanges occurring outward of and retaining related side edges of the rear wall of the column; said mounting late is fixed to and projects forwardly from the upper end of the rear wall of the column and has depending side flanges occurring outward of and retaining tne upper end portions of the side walls of the column; said rear wall is the primary support for components of the machine arranged within the column.

7. The beverage dispensing machine set forth in claim 6 wherein said top wall of the base has an upwardly projecting orienting pad corresponding in plan configuration with the inside cross-section of the column and normally slidably engaged in the lower portion of said column.

8. The beverage dispensing machine set forth in claim 6 wherein said operating stem of the control switch projects forwardly through an opening in the front wall of the column below said mounting plate, said control means includes an elongate vertical operating lever forward of the column and having an upper end pivotally carried by the mounting plate on a lateral access, a central portion engaging said stem and a lower glass engageable portion normally positioned in substantial vertical alignment with the mixing unit and in vertical spaced relationship between said mixing unit and the base.

9. The beverage dispensing machine set forth in claim 8 wherein the forward portion of the base opens forwardly and upwardly, a drip tray assembly comprising an upwardly opening box-like drawer substantially coextensive in plan configuration with the inside plan configuration of the base and shiftable into and out of engagement in the base from the open front end thereof and a grate corresponding in plan configuration with the plan configuration of the open top portion of the base and shiftable into and out of supported engagement over and with said forward portion of the base and the drawer therein.

10. The beverage dispensing machine set forth in claim 9 wherein said forward portion of the mounting plate has a central forwardly and vertically opening notch with laterally spaced inwardly disposed side edges, said mixing unit has a body portion with laterally outwardly disposed grooves normally slidably receiving the edges of the plate defining said notch, whereby said mixing unit is freely shiftable into and out of supported engagement with the mounting plate.

* * * * *